United States Patent
Jahnke

(10) Patent No.: US 7,152,028 B2
(45) Date of Patent: Dec. 19, 2006

(54) SOFTWARE DEVELOPMENT TOOL WITH EMBEDDED CACHE ANALYSIS

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 735 days.

(21) Appl. No.: 10/256,868

(22) Filed: Sep. 27, 2002

(65) Prior Publication Data

US 2003/0145307 A1    Jul. 31, 2003

Related U.S. Application Data

(60) Provisional application No. 60/341,204, filed on Dec. 13, 2001.

(51) Int. Cl.
G06F 9/45    (2006.01)
G06F 9/44    (2006.01)

(52) U.S. Cl. .................. 703/22; 703/13; 703/21; 703/26; 717/135; 717/138; 717/131

(58) Field of Classification Search ............ 703/13, 703/19, 21, 22, 26; 717/130, 170, 131, 135, 717/138
See application file for complete search history.

(56) References Cited

U.S. PATENT DOCUMENTS

| | | | | |
|---|---|---|---|---|
| 5,987,250 A | * | 11/1999 | Subrahmanyam | 717/130 |
| 6,002,875 A | * | 12/1999 | Stolberg | 717/153 |
| 6,226,790 B1 | * | 5/2001 | Wolf et al. | 717/135 |
| 6,507,809 B1 | * | 1/2003 | Yoshino et al. | 703/21 |
| 6,668,312 B1 | * | 12/2003 | Aubury | 711/170 |
| 6,691,080 B1 | * | 2/2004 | Tachibana | 703/19 |
| 6,704,925 B1 | * | 3/2004 | Bugnion | 717/138 |
| 7,010,722 B1 | * | 3/2006 | Jahnke | 714/30 |
| 2003/0009746 A1 | * | 1/2003 | Krishnan | 717/135 |
| 2003/0117971 A1 | * | 6/2003 | Aubury | 370/321 |

OTHER PUBLICATIONS

"Automatic and Efficient Evaluation of Memory Hierarchies for Embedded Systems", S. Abraham et al, Hewlett-Packard # HPL-1999-132, Oct. 1999.*
"Retargetable Cache Simulation Using High Level Processor Models", Ravindran et al, IEEE 0-7695-0954-1/01, IEEE Jan. 2001.*
"A Cache Visualization Tool", van de Deijl et al, IEEE 0018-9162/97, IEEE Jul. 1997.*

* cited by examiner

Primary Examiner—Fred Ferris
(74) Attorney, Agent, or Firm—Robert D. Marshall, Jr.; W. James Brady; Frederick J. Telecky, Jr.

(57) ABSTRACT

This invention is a method of complex cache memory analysis and synthesis. This invention proceeds in the normal fashion of writing a program and simulating it, but makes use of a closed loop design approach to completing the analysis-synthesis process. A program behavior analysis tool PBAT is integrated as part of an otherwise conventional program development tool. The PBAT offers a single environment where code development, simulator trace capture, and cache analysis take place. The cache analysis tool of PBAT is designed to match the current cache design of the processor and to identify any weakness in the current design or special features that need to be added. Code adjustments are passed back to the assembler and linker and in successive simulations using the integrated PBAT tool resulting in code that better fits a specific cache design.

13 Claims, 4 Drawing Sheets

SOFTWARE DEVELOPMENT TOOL WITH EMBEDDED CACHE ANALYSIS

This application claims priority under 35 USC 119(e)(1) of Provisional Application No. 60/341,204, filed Dec. 13, 2001.

INCORPORATION BY REFERENCE OF MATERIAL SUBMITTED ON A COMPACT DISK

This application incorporates by reference the computer program listing cana_c.txt of 10 Kbytes created Jun. 28, 2006 submitted in the accompanying compact disc.

TECHNICAL FIELD OF THE INVENTION

The technical field of this invention is embedded data processor design and more particularly analysis of cache performance in such designs.

BACKGROUND OF THE INVENTION

Complex embedded processor chips now use a wide variety of system configurations and are customized for a broad range of applications. Each design typically includes cache memory, but the range of complexity of even the cache memory varies significantly.

Many processors have complex memories that are partitioned into levels. The designation local memory is used for the innermost level of memory most tightly connected to the processor core. This local memory has the best possible performance because it will strongly affect processor throughput. Larger cache memories interfacing with the local memory and the processor itself are sometimes split into level 1 program cache memory and level 1 data cache memory. These caches have aggressive performance requirements as well, but generally are slightly lower in performance to the local memory portion.

Finally at the outer extremes of the embedded processor core, memory is designated the level 2 cache. Level 2 memory is sometimes quite large and often has more moderate speed performance specifications.

The process of designing an embedded processor or customizing a given embedded processor design for specific applications involves much analysis of all parts of the device. In addition, the computer program that is stored in the device must be developed and debugged in simulation or emulation. Conventional design has one or more controllers that must function in harmony to realize an efficient processor. These controllers are often divided into core control, memory control and peripheral control.

FIG. 1 illustrates an example of a conventional high-level processor block diagram. The processor core 100 operates under control of the core control logic block 101. The processor core 100 accesses its most critical data from the local memory 102, and receives its program instructions from level 1 program cache 103 and additional data from level 1 data cache 104. The task of the memory control block 105 is to drive the level 1 program cache 103, level 1 data cache 104, level 2 cache 106 and local memory 102 in a coherent fashion. Level 2 cache 106 is the buffer memory for all external data transactions. Large external memories normally have performance specifications not qualifying them for direct interface with the core processor. Program or data accesses having target information available only in external memory are buffered through level 2 cache 105 primarily, avoiding possible system performance degradation.

It is becoming increasingly common to process all other transactions through an integrated transaction processor here designated as enhanced direct memory access (EDMA) and peripheral control 112. Data can be brought in through the external memory interface 107 which can be externally connected to very high storage capacity external memories. These external memories have performance specifications not qualifying them for direct interface with the core processor.

The state machine and system control logic 113 is the highest level of control on this example processor. It interfaces with each of the other control elements, the memory control unit 105, the processor core control logic 101 and the enhanced direct memory access (EDMA) peripheral control element 112.

Complex multi-level cache memories are defined at a high level by a memory protocol. The memory protocol can be a set of statements about the modes of operation which the overall memory must placed to accomplish a requested task while it is in a pre-determined state. This protocol is typically reduced to a set of flow diagrams that define a state machine function. The designer often begins at this point with a well-defined protocol and an existing state machine, both of which may need to undergo some modification. The designer's first step is to write the computer program that will drive the system/memory operations. Analysis tools designed to debug new designs are available from a number of software vendors. Typically a number of simulation runs must be made and some adjustments in the code made between each run.

FIG. 2 illustrates the flow diagram of a conventional cache memory computer program analysis-synthesis process. Code development 200 is normally carried out using a conventional word processor text editor 210 and the trial code is compiled using one of several possible conventional toolsets. The compile step 201, assemble step 202, and link step 203 are normal processes preliminary to the simulation 204. Because of the many possible system configurations and the wide variety of applications being analyzed, the engineer must analyze the simulator output results manually in step 205. The engineer must then decide if the results are satisfactory in step 207. This standard of behavior could be a standard of computer timing behavior, computer processor loading or any other parameter crucial to acceptable performance of the computer program. If not, the engineer initiates code changes and a new simulation. In FIG. 2, path 208 indicates a positive outcome, the results are acceptable. This leads to the finish state. On the other hand path 209 indicates the negative outcome, the simulator results are not acceptable. This leads to a loop in the flow chart through manual adjust and edit step 206. Flow returns for another trial. Typically the second trial pass will begin at the re-compile step 201 and will proceed through all the previous conventional toolset steps.

SUMMARY OF THE INVENTION

This invention describes a unique means of analysis and synthesis of computer program and complex cache memory behavior that proceeds in the normal fashion of writing a computer program and simulating it, but makes use of a closed loop design approach with automatic code adjustments to complete the analysis-synthesis process. Described here is the program behavior analysis tool (PBAT) of this invention that offers a single environment where both code developments, simulator trace capture, and cache analysis can take place. The cache analysis/synthesis features of this tool are designed to coordinate with the current processor/cache operation and identify weaknesses in the current cache design and any special features that may need to be added.

A program behavior analysis tool (PBAT) is built directly into a comprehensive software development tool. PBAT can be configured to measure direct address accesses, or when a cache is used, to measure the number and frequency of the blocks used. PBAT reads a trace file generated by the simulator, and keeps track of how often a particular address or block is used. The focus of this invention is the development and debugging of the computer program by means of a program simulation and analysis tool chain, and the solution to questions of how the code should be arranged depending on application behavior.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
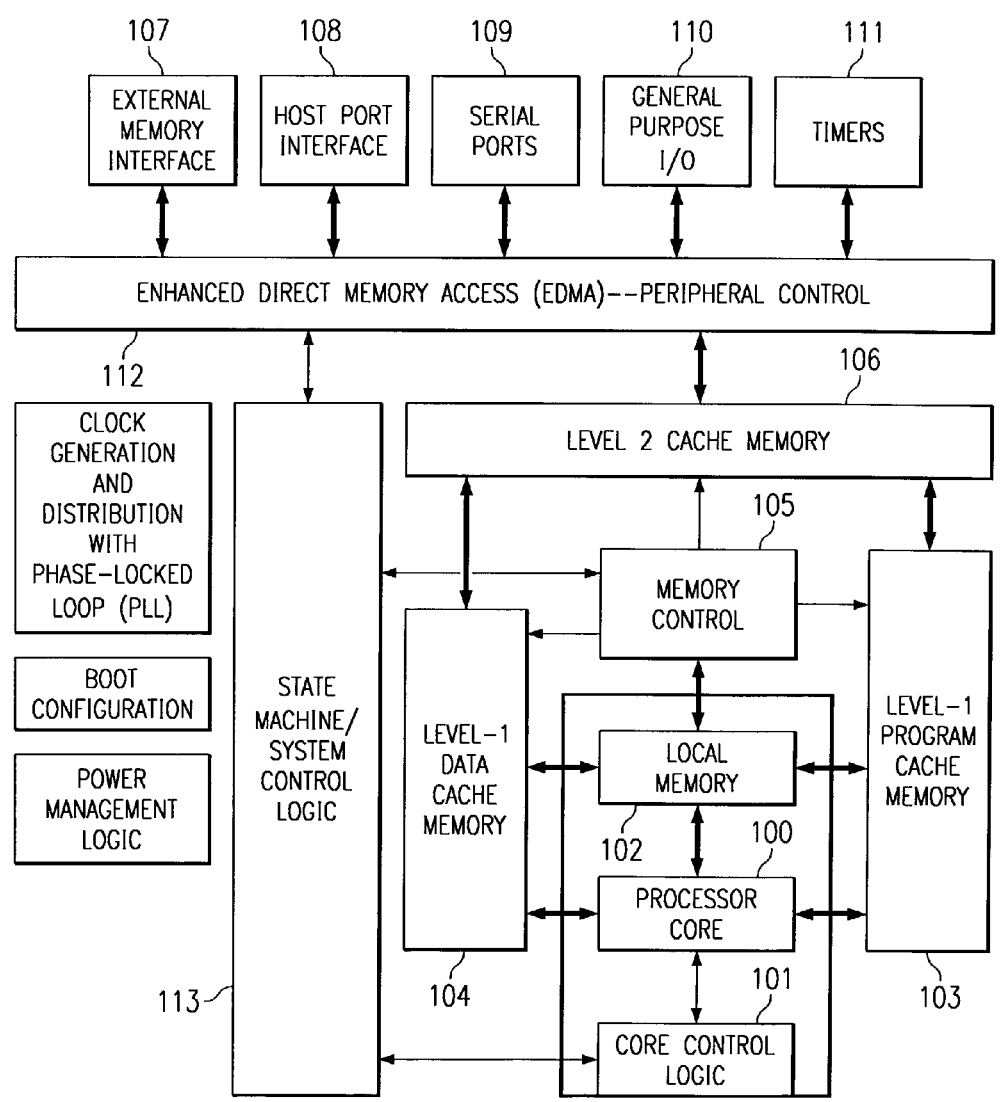
FIG. 1 illustrates the individual functional blocks of a typical conventional embedded processor of the prior art.

When developing software for a cached-based processor, the designers often desire to understand how efficient the cache design is for the particular application. Conventional software development tools do not offer any support for actual analysis of program address and data activity. These conventional software tools provide profiling to determine how much time a program spends in a given function and typically the simulators provide trace capture capability during a simulation, but no means is provided to analyze this trace.

Trace analysis includes the generation of data such as the number of times a particular address is accessed, and in the case of a cached-based processor, what addresses belong to which cache blocks. When deciding parameters such as cache size a more detailed tool is required. This tool should be specifically targeted to the organization and behavior of the cache system under consideration.

This invention describes a program behavior analysis tool (PBAT) that allows for cache analysis/synthesis integrated as part of the standard software development tool chain. It also offers a single environment where not only code development, but also simulator trace capture and cache analysis can take place. The cache analysis approach of this tool is designed to match the current cache design of the processor and is targeted toward identifying any weaknesses in the current cache design or special features that should be added.

Currently there is no software tool available that will take in a trace file from a cache analysis tool and determine the program behavior. While it is possible to use actual fabricated devices to measure program behavior with an industry standard logic analyzer or similar hardware tool and use built in software in the analysis tool to determine program behavior, usually no fabricated devices are available when the analysis is needed.

This invention describes a program behavior analysis tool (PBAT) built directly into the software development toolkit. PBAT can be configured to measure direct address accesses, or when a cache is used, to measure the number and frequency of the blocks used. This program behavior analysis tool reads a trace file generated by the simulator and keeps track of how often a particular address or block is used.

PBAT permits within a single tool chain development, simulation and analysis of both hardware and software performance. Conventional tools allow for the development, simulation and analysis of software behavior through a profiler. The addition of the PBAT tool allows for more advanced analysis including the measurement of address access behavior and allows the user to configure the cache hardware to be optimized. Conventional tools will not currently optimize the code for a particular cache configuration and there is consequently no way to determine the optimal cache configuration for a particular application. Current cache analysis tools provide information on the behavior of a cache configuration but will only show what is happening during process cycles. They do not make adjustments.

Current tools, for example, will measure hit rate, but cannot feed that information back to the assembler and linker to make adjustments to improve performance. The integrated tool of this invention is intended to fill this void.

The PBAT tool enables measurement of actual cache behavior so that the cache hardware parameters (size, line size, replacement algorithm, etc.) can be optimized.

Figure 2:
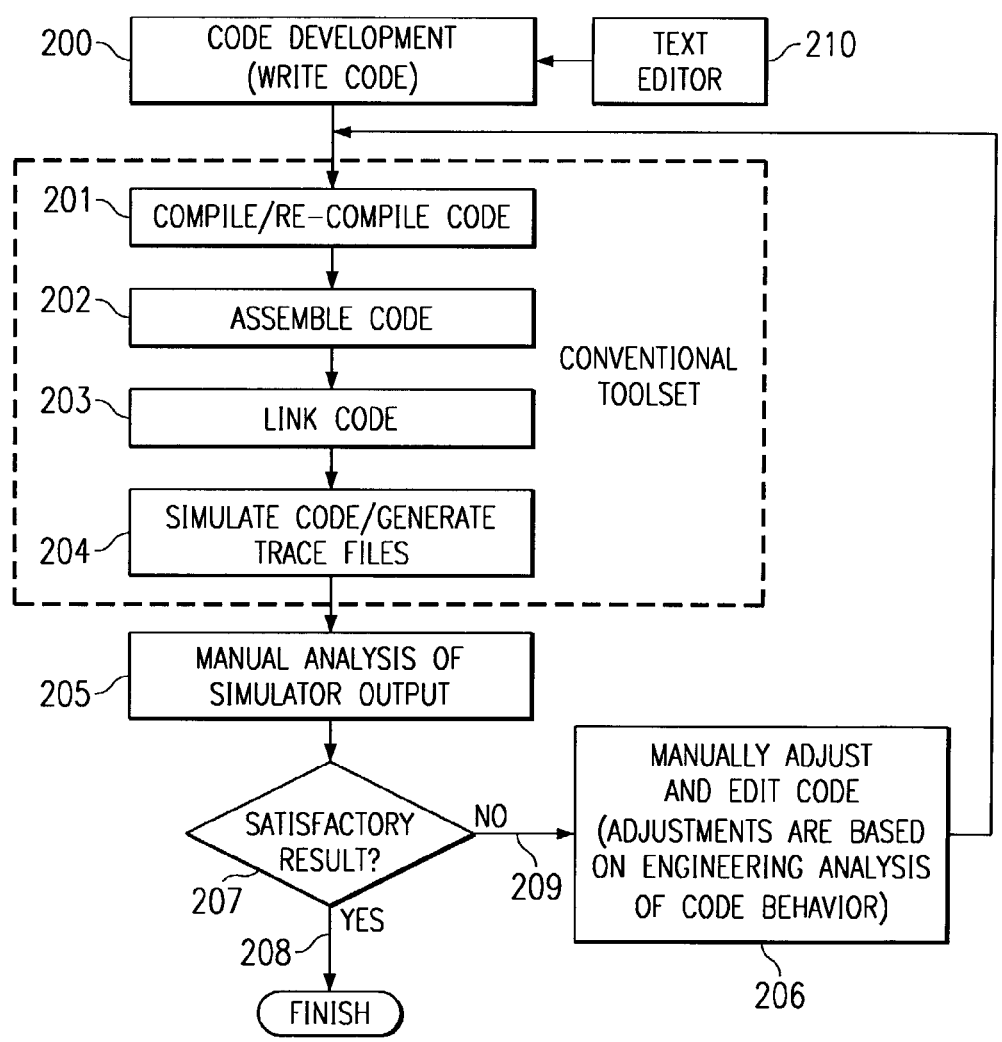
FIG. 2 illustrates the flow diagram for conventional, manual computer program analysis-synthesis of a typical cache memory using a conventional toolset of the prior art.
Figure 3:
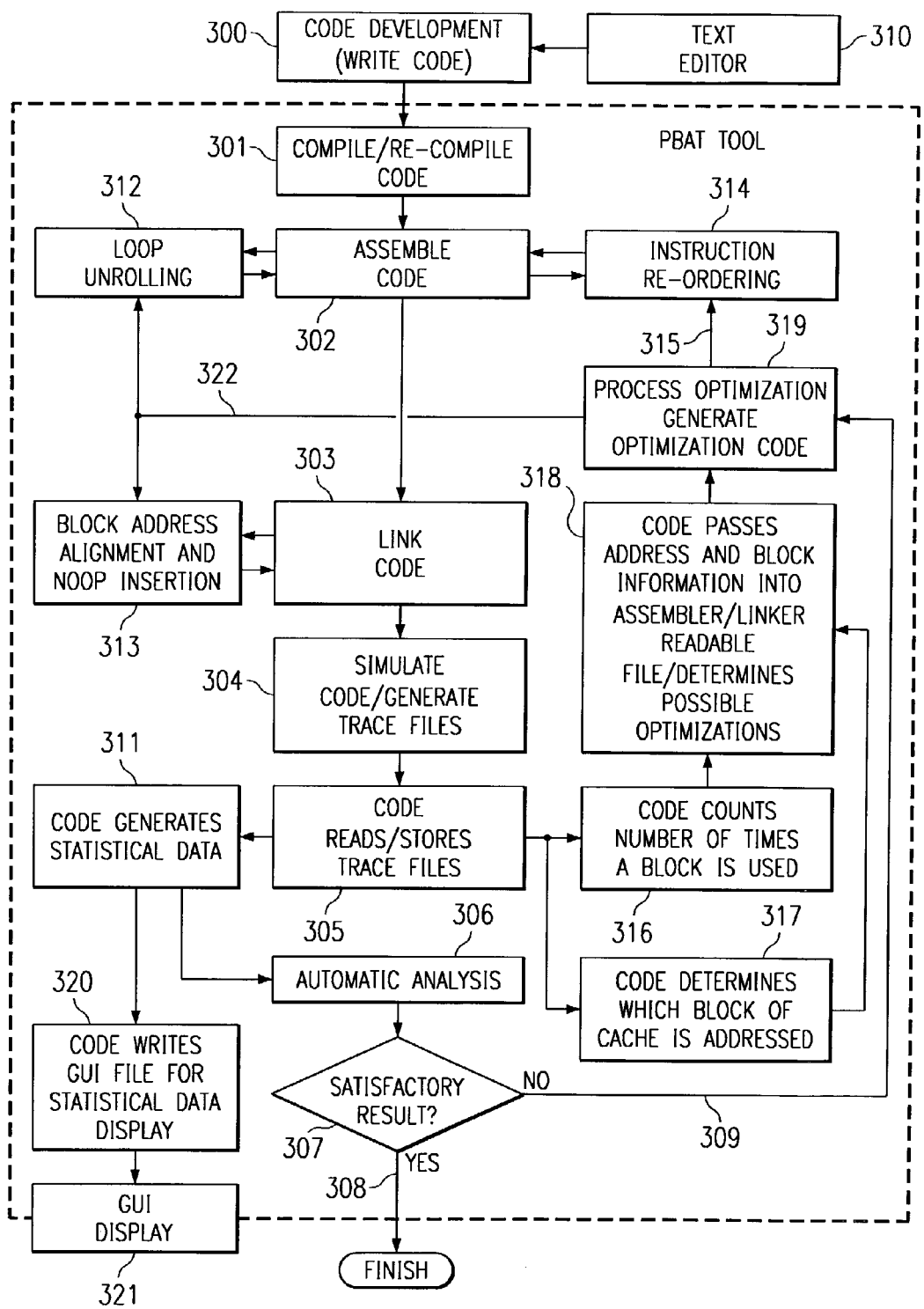
FIG. 3 illustrates details of the feedback elements of PBAT tool of this invention and the automatic optimization of assembler and linker adjustments to accomplish the cache memory computer program analysis-synthesis process.

FIG. 3 illustrates the details of the feedback-related elements of PBAT tool of this invention and its automatic optimization of assembler and linker adjustments to accomplish the cache memory computer program analysis-synthesis process. Blocks 310 and 301 to 304 mirror corresponding steps 210 and 201 to 204 for the conventional toolset of FIG. 2. The invention focuses on the addition of blocks 305, 306 and 311 to replace block 205 of the conventional toolset. These three blocks provide the automatic analysis of simulator output via PBAT. In block 304, simulation output traces are written and stored in assembler/linker storage files. These traces are retrieved directly by block 311 which, through the action of this invention, generates and stores statistical data on the present iteration of the simulation. Block 320 writes this statistical data to a graphical user interface (GUI) file that is used to display graphically the statistical results to the user. The statistical data compiled in block 311 is also used to perform a code driven automatic analysis in block 306. This automatic analysis is subjected to a code driven comparison in block 307 against performance standards to evaluate the question of whether a satisfactory result has been achieved. If the result is satisfactory (Yes), the analysis/synthesis process reaches the finish state 308. If the particular analysis/synthesis iteration being carried out does not produce a satisfactory result (No), path 309 initiates process optimization and generation of new code block 319.

Block 316 uses the statistical data generated from the trace files of block 305 to count the number of times a block performs an operation. Block 317 uses the statistical data generated from the trace files of block 305 to determine the frequency distribution of usage of the cache blocks in the system. Both blocks 316 and 317 are code driven evaluations. These evaluations strongly influence the possible design code optimizations which may be undertaken in the feedback path. Block 318 evaluates the data from blocks 316 and 317 and determines what code optimizations are to be a part of the process optimization of block 319.

The special code generated in block 319 is used to direct a re-ordering of the instructions in block 314. The PBAT tool of this invention directs modifications in both the assembler 302 and the linker 303 operations.

The closed-loop portion of the PBAT tool starts with an automatic analysis of the simulator output trace files stored in block 305. These files are processed in blocks 311 and 306. Blocks 311 and 303 are first steps of the flow enabling viewed results and initiating process optimization.

Process optimization block 319 involves two branches, one affecting assembler feedback and a second branch affecting linker feedback.

Process optimization block 318 uses the results of the data generated in blocks 316 (block usage) and 317 (cache block hit frequency) to determine which instructions are used in the present iteration and if there is a possibility of re-ordering these instructions to allow them to be carried out more efficiently. With this invention, the assembler is able to use information on how the respective processes ran in the previous iteration to optimize those processes.

For example, a register operation can be substituted for a memory operation in a portion of the processing where, in the previous iteration, another memory operation had already been initiated in the same cache block and a register was free to be used. Assembler feedback process optimization block 319 via path 315 coordinates decisions regarding instruction re-ordering block 314. Path 322 of the assembler feedback directs the loop unrolling process 312. This is assembler-related and also aids the processor in operating more efficiently.

Loop unrolling involves taking a loop and copying it. This doubles the number of instructions required, but cuts in half the number of loop iterations. This allows for more optimized register allocations and may reduce memory accesses. An example loop is below:

| Loop Start | | |
|---|---|---|
| LDR | r1, @0x100; | Get data 1 stored in memory |
| LDR | r2, @0x104; | Get data 2 stored in memory |
| ADD | r3, r1, r2; | Add r1 and r2, store in r3; |
| STR | r3, @0x108; | Store result to memory |
| ADD | r4, 1, r4; | increment loop counter |
| CMP | r4, 20; | see if loop went 20 times |
| BNE | Loop Start; | If not, loop again |

When the loop is unrolled one time it looks like this:

| Loop Start | | |
|---|---|---|
| LDR | r1, @0x100; | Get data1 stored in memory |
| LDR | r2, @0x104; | Get data2 stored in memory |
| ADD | r3, r1, r2; | Add r1 and r2, store in r3 |
| STR | r3, @0x108; | Store result to memory |
| LDR | r5, @0x100; | Get data 1 stored in memory |
| LDR | r6, @0x104; | Get data2 stored in memory |
| ADD | r7, r5, r6; | Add r1 and r2, store in r3 |
| STR | r3, @0x10C; | Store result to memory |
| ADD | r4, 1, r4; | increment loop counter |
| ADD | r4, 1, r4; | increment loop counter |

| -continued | | |
|---|---|---|
| Loop Start | | |
| CMP | r4, 10; | See if loop went 10 times |
| BNE | Loop Start; | If not, loop again. |

This process of loop unrolling is useful to help get code blocks to fit inside of blocks. Ideally, the entire loop would fill a cache block. Then, the cache would not be filled with useless instructions and the next segment of the code starts on a block-aligned address. It may also be useful to de-unroll previous unrolled loops in order to achieve a fit in the block or to allow for more loop iterations in some cases. Note that cache is best used when code loops many times, but often an assembler will unroll the loop to avoid pipeline stalls on register dependencies.

A basic requirement for the linker to perform efficiently is that it initiates blocks of processing on block-aligned addresses. Process optimization block 319 directs this via path 322 through block address alignment and/or NOOP instruction insertion (both included in block 313) The inserted NOOP instruction will often facilitate seamless block transitions by inserting empty space or no-operations (NOOP) instructions between block stop and starts. If a block can start on a blockaligned address, cache-miss penalties are reduced by allowing the central processing unit to run directly the code it prefers to run first. Additionally, this does not waste valuable processor cycles filling up the cache space with superfluous instructions or data.

The code listing in the compact disc appendix (labeled cana_c.txt) covers the process of block 306 of FIG. 3, the analysis of pre-processed trace file data from block 311, and determination of the count of the number of times an address is accessed 317. The code also determines to what block the address belongs and how many times the block is used (block 316). This code would have to be refined somewhat to cover a general use case, consequently many details are not included.

Figure 4:
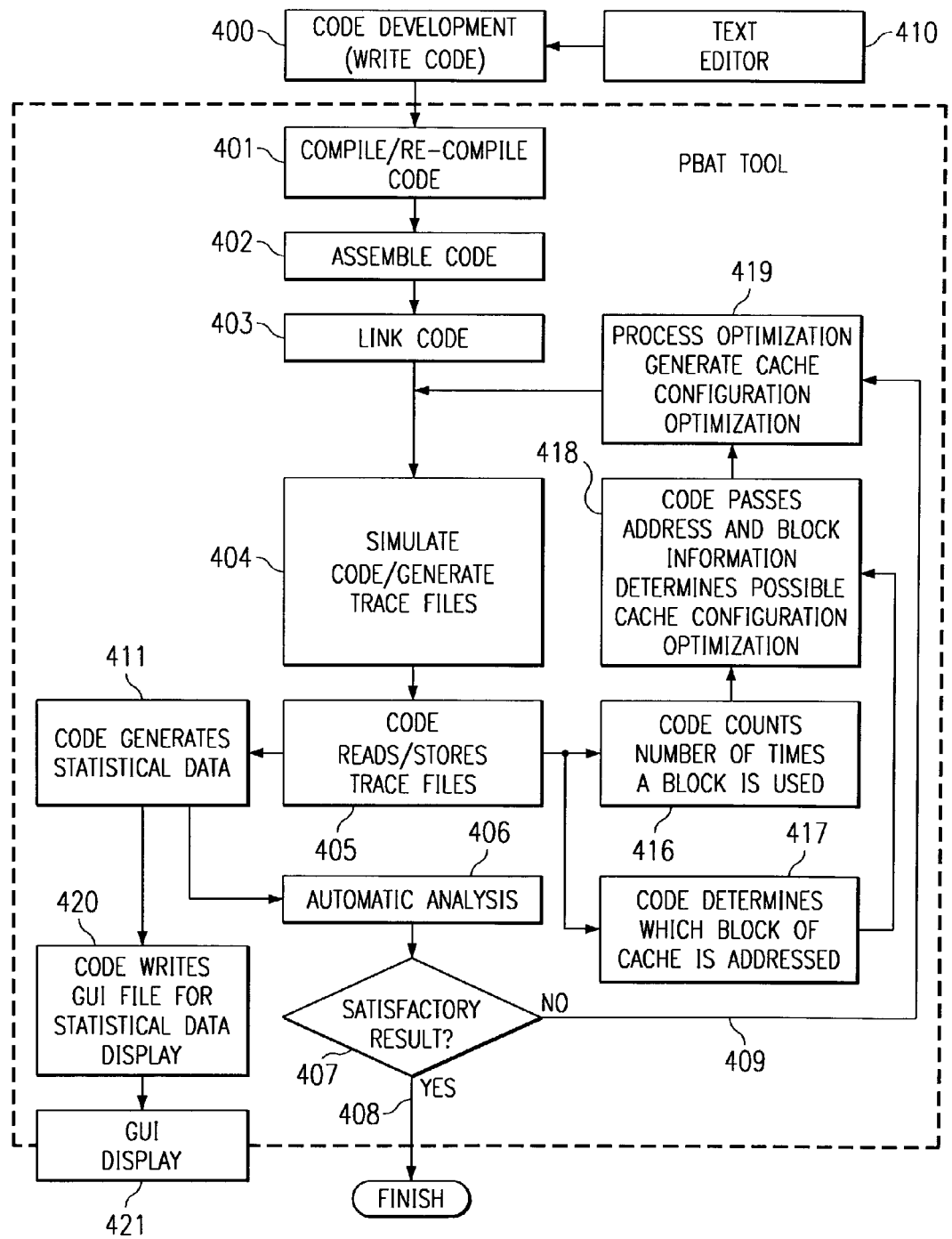
FIG. 4 illustrates details of an alternative to the invention of FIG. 3.

FIG. 4 illustrates another embodiment of this invention. Optimal selection of the cache configuration for a product, particularly using an embedded processor, can be a major problem. In an embedded processor, a single integrated circuit or a small number of integrated circuits provide the electronics for the product. The integrated circuit including the data processor also includes other parts such as memory and peripherals. Often it is not possible to connect to the data processor directly because it is isolated from the integrated circuit pins by the other parts of the electronic system. Thus, it may be difficult to directly measure data processing performance in relation to memory and peripherals. Embedded products often use existing central processing unit cores with known instruction sets and memory, cache and peripherals selected for the particular product. In the product design phase, it is often difficult to determine the best cache configuration or even whether cache is advantageous.

FIG. 4 illustrates the details of the feedback-related elements of PBAT tool of this invention and its automatic optimization of cache configuration to accomplish the cache memory computer program analysis-synthesis process. Most parts of FIG. 4 correspond to the correspondingly numbered parts of FIG. 3. Blocks 410 and 401 to 403 mirror corresponding blocks 310 and 301 to 303 of FIG. 3. In block 404, simulation output traces are written and stored in assembler/linker storage files. Block 404 performs the simulation for a particular cache configuration. Block 411 generates and stores statistical data on the present iteration of the simulation. Block 420 writes this statistical data to a graphical user interface (GUI) file that is used to display graphically the statistical results to the user. The statistical data compiled in block 411 is also used to perform a code driven automatic analysis in block 406. This automatic analysis is subjected to a code driven comparison in block 407 against performance standards to evaluate the question of whether a satisfactory result has been achieved. If the result is satisfactory (Yes), the analysis/synthesis process reaches the finish via path 408. If the particular analysis/synthesis iteration being carried out does not produce a satisfactory result (No), path 409 initiates process optimization and generation of new cache configuration in block 419.

Block 416 uses the statistical data generated from the trace files of block 405 to count the number of times a block performs an operation. Block 417 uses the statistical data generated from the trace files of block 405 to determine the frequency distribution of usage of the cache blocks in the system. Both blocks 416 and 417 are code driven evaluations. These evaluations strongly influence the possible design code optimizations which may be undertaken in the feedback path. Block 418 evaluates the data from blocks 416 and 417 and determines what code optimizations are to be a part of the cache configuration optimization of block 419.

Block 419 is used to direct a modification of the cache configuration used in the simulation of block 404. There are many cache configuration variables that can be modified by the PBAT tool of this invention. These include total cache size, cache line size, cache way organization, replacement algorithm, selection of writeback or write through operation and selection of whether to provide write allocation. The cache hit rate and thus overall perform may be expected to increase with increase cache size. This system permits testing of varying cache sizes to determine whether a cache size increase provides sufficient improved performance to justify its additional cost. The nature of the program being executed determines the optimum cache line size. A linear program may work acceptably well with a small cache line size while another program may require a larger cache size due to more random memory accesses. The cache way organization deals with the number of cache lines than can store data for a particular memory address. In a direct mapped cache, data for each memory address may be stored in only one location within the cache. In a full associative cache, data for each memory address may be stored in any cache line. An N-way set associative cache permits data for any particular memory address to be stored in N locations within the cache. Caches are typically two-way or four-way set associative. The number of cache ways interacts with the replacement algorithm because each set of cache locations that can store data from the same memory address requires a manner for determining which data is to be replaced to make room for more data. A typical cache replacement algorithm replaces the least recently used cache line. However, it is possible to store statistics on cache line use and replace a different cache line if the least recently used cache line has been heavily used in the recent past.

Writeback and write through are alternate methods of handling keeping the main memory coherent. In a writeback system, data may be changed in the cache. Such changed data is marked dirty. When a cache line must be replaced, dirty data must be written back to a memory higher in the hierarchy and ultimately to the main memory before it can be discarded. Clean data need only be discarded. In a write through system, data is always simultaneously written to the cache and main memory. Thus cache data is never dirty and any cache line may be discarded to make room for new data. A writeback system tends to be better if data is written to the same address repeatedly before the algorithm finishes with the data. A write through system tends to be better if data is only written once or a few times.

Write allocation is providing a place in the cache to store data corresponding to a write address. All caches perform read allocation, that is, they provide a copy of the data in the cache upon a central processing unit read. This cache copy of the data will then be available for faster reads and writes. Write allocation tends to help processor performance is the program later reads that data repeatedly. Without a simulation, it would be difficult to determine whether write allocation would be advantageous for a particular product.

It is often the case that the central processing unit is selected for the product before other decisions regarding the peripherals, cache configuration and computer program are selected. Using this invention as shown in FIG. 4 permits algorithms or a set of likely used algorithms to be simulated with various cache configurations without building the hardware. Additionally, as noted above, the computer program often interacts with the cache configuration. A combination of FIGS. 3 and 4 of this invention permits selection of the cache configuration in conjunction with the computer program in a manner not previously known.

What is claimed is:

1. A method for analysis and synthesis of computer program operations in a computer system having cache memory, said method comprising the steps of:

simulating program operation for a current computer program for the purpose of evaluating cache memory behavior;

compiling resulting statistics regarding the cache memory behavior in the simulating step;

comparing said resulting statistics to a standard of program behavior to determine whether said simulated program operation is satisfactory;

if said simulated program operation is satisfactory, recording the current program;

if said simulated program operation is not satisfactory
modifying the computer program, said step of modifying the computer program unrolls loops in program operation, and
repeating said steps of simulating, compiling statistics, comparing statistics to a standard until said simulated program operation is satisfactory.

2. The method of claim 1 wherein:

said step of modifying the computer keeps an unrolled loop length less than a primary cache size.

3. A method for analysis and synthesis of computer program operations in a computer system having cache memory, said method comprising the steps of:

simulating program operation for a current computer program for the purpose of evaluating cache memory behavior;

compiling resulting statistics regarding the cache memory behavior in the simulating step;

comparing said resulting statistics to a standard of program behavior to determine whether said simulated program operation is satisfactory;

if said simulated program operation is satisfactory, recording the current program;

if said simulated program operation is not satisfactory modifying the computer program, said step of modifying the computer program aligns loop starts to addresses translating to beginning of a cache block, and repeating said steps of simulating, compiling statistics, comparing statistics to a standard until said simulated program operation is satisfactory.

4. The method of claim 3 wherein:

said step of aligning loop starts to addresses translating to beginning of a cache block inserts null operations before loop start.

5. A method for analysis and synthesis of computer program operations in a computer system having cache memory, said method comprising the steps of:

simulating program operation for a current computer program for the purpose of evaluating cache memory behavior, said step of simulating program operation assumes a current cache configuration;

compiling resulting statistics regarding the cache memory behavior in the simulating step;

comparing said resulting statistics to a standard of program behavior to determine whether said simulated program operation is satisfactory;

if said simulated program operation is satisfactory, recording the current program; and if said simulated program operation is not satisfactory modifying the cache configuration, and repeating said steps of simulating, compiling statistics, comparing statistics to a standard and modifying the cache configuration until said simulated program operation is satisfactory.

6. The method of claim 5 wherein:

said assumed current cache configuration has a predetermined cache size; and if said simulated program operation is not satisfactory said method further includes the step of modifying the predetermined cache size.

7. The method of claim 5 wherein:

said assumed current cache configuration has a predetermined cache line size; and if said simulated program operation is not satisfactory said method further includes the step of modifying the predetermined cache line size.

8. The method of claim 5 wherein:

said assumed current cache configuration has a predetermined set associativity; and if said simulated program operation is not satisfactory said method further includes the step of modifying the predetermined set associativity.

9. The method of claim 5 wherein:

said assumed current cache configuration has a predetermined replacement algorithm; and if said simulated program operation is not satisfactory said method further includes the step of modifying the predetermined replacement algorithm.

10. The method of claim 5 wherein:

said assumed current cache configuration implements a writeback protocol; and if said simulated program operation is not satisfactory said method further includes the step of modifying the cache configuration by changing the writeback protocol to a write through protocol.

11. The method of claim 5 wherein:

said assumed current cache configuration implements a write through protocol; and if said simulated program operation is not satisfactory said method further includes the step of modifying the cache configuration by changing the write through protocol to a writeback protocol.

12. The method of claim 5 wherein:

said assumed current cache configuration enables write allocation; and if said simulated program operation is not satisfactory said method further includes the step of modifying the cache configuration by prohibiting write allocation.

13. The method of claim 5 wherein:

said assumed current cache configuration prohibits write allocation; and if said simulated program operation is not satisfactory said method further includes the step of modifying the cache configuration by enabling write allocation.

* * * * *